April 29, 1941.　　　　F. M. WILLARD　　　　2,240,430
JACK MECHANISM
Filed March 16, 1939　　2 Sheets-Sheet 1
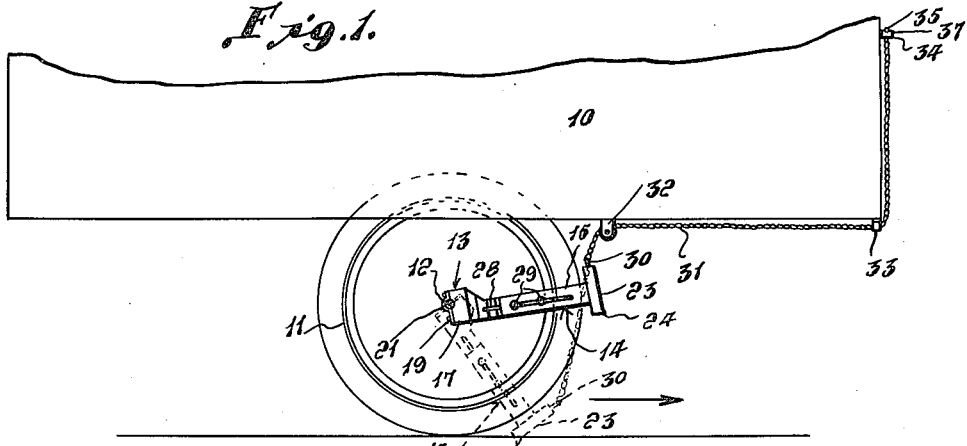
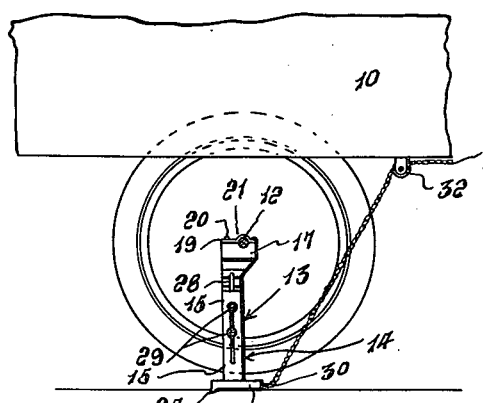
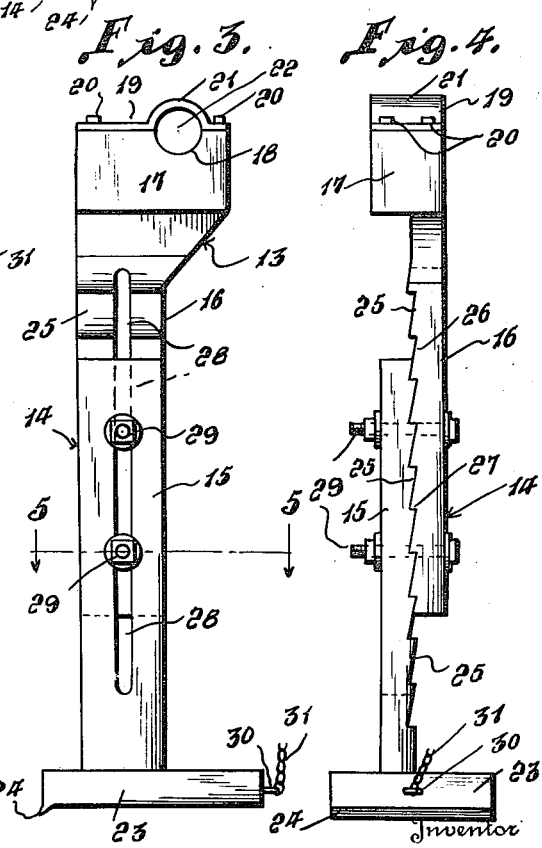
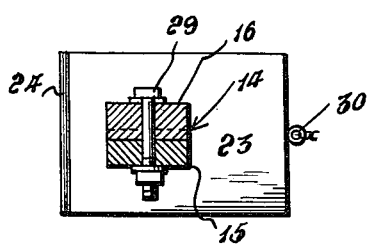
Frank M. Willard April 29, 1941.                F. M. WILLARD                2,240,430
                              JACK MECHANISM
                    Filed March 16, 1939        2 Sheets-Sheet 2
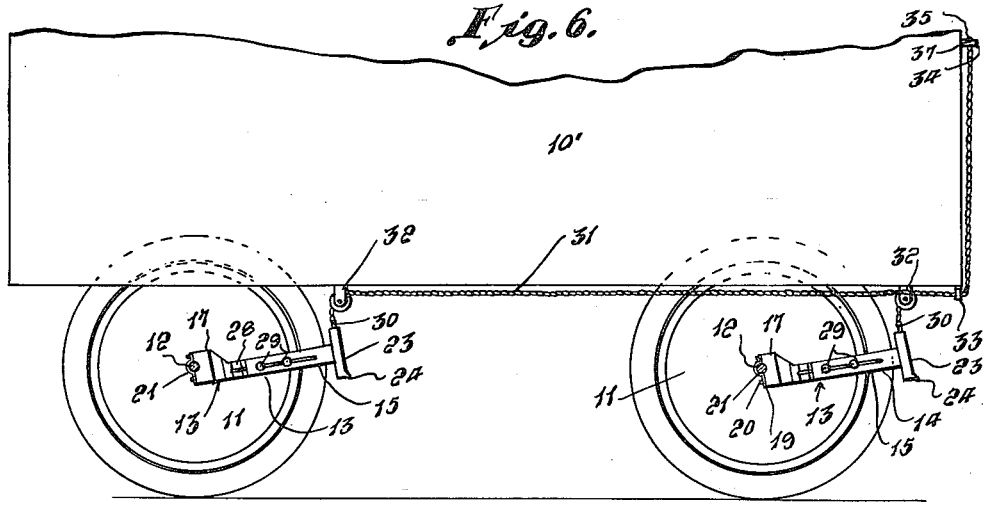
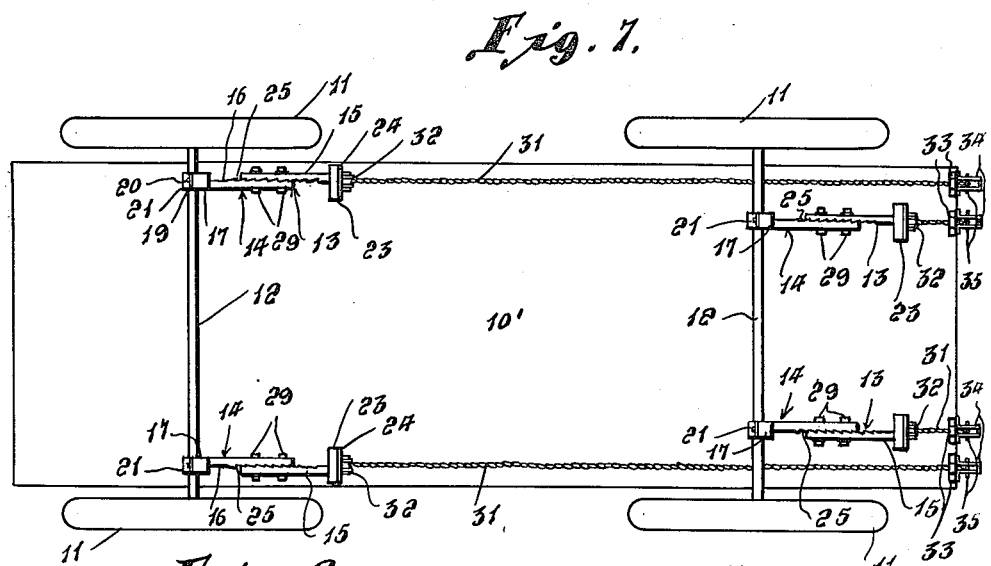
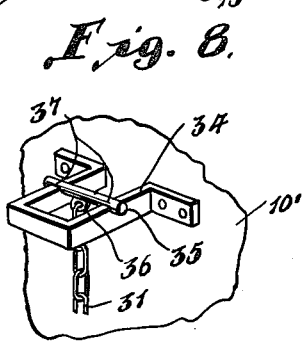
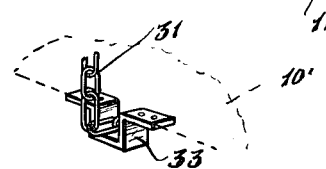
Inventor
Frank M. Willard
By L. F. Randolph
Attorney Patented Apr. 29, 1941　　　　　　　　　　　　　　　　　　　　　2,240,430

UNITED STATES PATENT OFFICE 2,240,430

JACK MECHANISM

Frank M. Willard, Timber Lake, S. Dak.

Application March 16, 1939, Serial No. 262,254

4 Claims. (Cl. 254—86)

This invention relates to an improved jack system or mechanism particularly adapted for trailer vehicles.

More particularly, it is an aim of this invention to provide a plurality of extension jacks pivotally connected to the axles of a trailer vehicle and disposed adjacent the wheels thereof and provided with means whereby they may be selectively released for raising one or all of the wheels of the vehicle.

It is a further aim of this invention to provide a jack system for two of four wheeled trailers whereby the jacks may all be released so that by moving the vehicle in one direction all of the wheels thereof will be elevated and by moving the vehicle in the opposite direction it may be moved off of all of the jacks.

Still a further aim of the invention is to provide a mechanism whereby the jacks may be readily raised and lowered, and whereby the jacks, when being lowered, can not be moved past a vertical position so that the vehicle can be raised only by being moved in one direction and may be lowered off of the jacks only by being moved in the oposite direction.

Still a further aim of the invention is to provide means whereby the jacks, when in an operable position, will be offset relatively to the axles to prevent the vehicle from moving off the jacks in one direction, and means associated with the raising and lowering means for the jacks for preventing the vehicle from moving off of the jacks in the opposite direction.

Other objects and advantages of the invention will hereinafter become more fully apparent from the following description of the drawings, which illustrate a preferred embodiment thereof, and wherein:

Figure 1 is a side elevational view of a two-wheeled trailer equipped with the jack mechanism and showing one of the jacks in an elevated position, Figure 2 is a view similar to Figure 1 showing the jack in a lowered or operable position, Figure 3 is an enlarged side elevational view of one of the jacks, Figure 4 is a rear elevational view of the same looking from the right of Figure 3, Figure 5 is a horizontal sectional view taken along the line 5—5 of Figure 3, Figure 6 is a view similar to Figure 1 showing the jack mechanism applied to a four-wheeled vehicle, Figure 7 is a bottom plan view of the four-wheeled vehicle showing the jacks in an elevated inoperable position, Figure 8 is a fragmentary perspective view showing the bracket for holding the chains for supporting the jacks in an elevated position, and Figure 9 is a similar view showing the combined brackets and guide members for limiting the movement of the jacks.

Referring more particularly to the drawings, wherein like reference characters designated like or corresponding parts throughout the different views, 10 designates generally a two-wheeled trailer provided with a single pair of wheels 11 journaled on the ends of an axle 12. In Figures 6 and 7 a four-wheeled trailer 10' provided with four wheels 11 and two axles 12 is shown. The vehicles 10 and 10' are shown merely to illustrate the application of the jack system or mechanism, comprising this invention, and which will hereinafter be described.

The invention includes a plurality of jack members, designated generally 13, and each comprising a standard, designated generally 14 formed of the sections 15 and 16. A head 17 is secured to the upper end of the upper section 16, or may be formed integral therewith, and is preferably enlarged to provide a portion which is offset relatively to the shank 14. In the upper edge of this offset portion is provided a semi-circular groove 18. A plate 19 is removably secured along the upper edge of the head 17 by means of the fastening 20 and is provided with an arcuately shaped portion 21 which aligns with the groove 18 to provide the transverse opening 22, for a purpose which will hereinafter be described. A foot 23 is secured to or formed integral with the lower end of the lower section 15 and is offset relatively to the shank or standard 14 with its offset end extending in the same direction as the offset portion of head 17. The opposite end of the foot 23 is provided with a depending cleat 24, extending the width thereof, for a purpose which will hereinafter be described.

Standard sections 15 and 16 are provided in their abutting sides with corresponding notches 25 which extend in opposite directions to form the downwardly facing shoulders 26 in the section 16 which are adapted to rest upon the upwardly facing corresponding shoulders 27 in the section 15 when some or all of the notches 25 of the two sections are in engagement, as illustrated in Figure 4. Sections 15 and 16 are provided with the longitudinal slots 28 through which are adapted to extend bolts having threaded free ends to receive nuts to form the clamping fastenings 29 by means of which the notches 25 of the two sections may be clamped together for thereby adjusting the standards 14 to any of a plurality of lengths.

Openings 22 form bearings adapted to loosely engage the axle or axles 12 for pivotally mounting the jacks 13 relatively thereto. In either the two or four wheeled type trailer, the jacks 13 are mounted on the axle or axles 12 so that the offset portion of the head 17 and the offset end of the foot 23 of each of the jacks 13 project in the same direction, which is preferably toward the rear end of the vehicle, as illustrated in Figures 1, 6 and 7. The feet 23 at their offset ends are provided with eye screws 30 to which are connected corresponding ends of the flexible members 31, which as illustrated, may be in the form of chains. A pulley 32 is provided on the under side of either of the vehicles 10 or 10' for each of the flexible members 31 and the pulley 32 of each flexible member 31 is disposed substantially above the foot 23 to which the member 31 is secured when the jack 13 is in an elevated position, as illustrated in Figures 1 to 6. Each of the members 31 is trained over a pulley 32 and then extends rearwardly through a U-shaped bracket 33 at the rear end of the trailer 10 or 10', which is aligned with the pulley 32, which supports the chain. Secured to the back ends of the vehicles 10 and 10' and disposed directly above the members 33, and spaced therefrom, are the U-shaped brackets 34 which project outwardly from the back end of the vehicles 10 or 10'. A cross bar or handle 35 is secured to the free end of each of the flexible members or chains 31 by means of a depending apertured ear 36, which is disposed intermediate of the ends of the bar 35 and to which the free end of each of the flexible members 31 is secured. The bars or handles 35 are provided with notches 37 in their under sides and adjacent their ends to engage the legs of the brackets 34.

From the foregoing it will be seen, that the jacks 13 on either the two or four wheeled trailer may be raised to an inoperable position by being swung rearwardly by pulling the handle portions 35 of the flexible members 31 to which the jacks are connected and may be held in a raised position by passing the bars 35 through the brackets 34 and positioning the bars so that the notches 37 rest on the legs of the brackets 34, as illustrated in Figure 8, to retain the jacks in an elevated position. The distance between the brackets 33 and the brackets 34 with which each flexible member or chain 31 is associated is equal to the distance that the foot 23 of each jack 13 travels from its fully raised position, as seen in Figure 1, to its fully lowered position, as seen in Figure 2, so that the cross bars 35 can be released from the brackets 34 to lower the jacks 13 and positioned to engage the legs of the brackets 33 so that when the jacks 13 are in a fully lowered position or in a vertical position the chains or flexible members 31 will be taut. In this manner the flexible members 31 are set to prevent the jacks 13 from swinging beyond a vertical position. Any one wheel of either trailer 10 or 10' may be elevated by releasing its flexible member 31 and setting it as heretofore described and then backing the trailer onto the lowered jack, or all of the wheels of either trailer may be raised simultaneously by releasing and setting each chain and then backing the trailer onto the jacks. By offsetting the head and feet 23 so that the standards 14 will be disposed forward of the axles 12, as best illustrated in Figure 2, will prevent the trailer from accidentally moving forward and off of its jacks. The trailers will be prevented from moving rearwardly and off of their jacks due to the chains 31 which are taut when the jacks are in their lowered positions thereby preventing the jacks from swinging forward. The cleats 24, as illustrated in dotted lines in Figure 1, are adapted to engage the supporting surface of the wheels 11 when lowered to prevent the feet 23 from sliding so that when the trailers 10 or 10' are pushed rearwardly the jacks 13 will swing under the trailer axles to raise the wheels 11.

Various modifications and changes in the precise construction and arrangement of the parts forming the invention are contemplated and may obviously be resorted to; and the right is therefore expressly reserved to make such modifications and changes as do not depart from the spirit and scope of the invention as hereinafter defined by the appended claims.

I claim as my invention:

1. A vehicle jack comprising a standard formed of sections, a head secured to the remote end of one of said sections and offset relatively thereto, the offset portion of the head being pivotally connected to the axle of a vehicle for offsetting the standard relatively to the vertical plane of the axle when the standard is in an upright, supporting position, a foot connected to the remote end of the other section and offset in the same direction therefrom as the head and in the opposite direction relatively to which the standard is offset from the axle, and said foot being provided with a depending flange at the end opposite to said offset end.

2. A device as in claim 1 comprising flexible means secured to and projecting away from the offset end of said foot and extending beyond an end of the vehicle for raising and lowering the jack, and means carried by said vehicle for engaging said flexible means for limiting the movement of the jack toward an operable position.

3. A vehicle jack comprising a standard, a head formed on one end of the standard and provided with an opening for loosely engaging an axle of a vehicle for pivotally mounting the jack thereon, said opening being offset relatively to the axis of the standard so that the standard, when in an upright position will be offset relatively to the vertical plane of the axle, a foot on the opposite end of the standard for engaging a supporting surface, and means for raising and lowering the jack, said foot comprising a plate attached adjacent one end to the standard, the foot being offset relatively to said standard in the same direction as the opening in the head.

4. A vehicle jack comprising a standard, a head formed on one end of the standard and provided with an opening for loosely engaging an axle of a vehicle for pivotally mounting the jack thereon, said opening being offset relatively to the axis of the standard so that the standard, when in an upright position will be offset relatively to the vertical plane of the axle, a foot on the opposite end of the standard for engaging a supporting surface, and means for raising and lowering the jack, said foot comprising a plate attached adjacent one end to the standard, the foot being offset relatively to said standard in the same direction as the opening in the head, said raising and lowering means comprising a flexible member connected at one end to the last mentioned end of said foot for raising and lowering the jack, and a keeper fixed to the vehicle for limiting the movement of the flexible member to prevent the jack from swinging in one direction past an upright position.

FRANK M. WILLARD.